Feb. 23, 1954  J. J. FRANK  2,670,294
METHOD OF SEALING SAUSAGE CASINGS AND PRODUCT THEREOF
Filed Feb. 4, 1950

INVENTOR.
JOSEPH J. FRANK
BY
ATTORNEY

Patented Feb. 23, 1954

2,670,294

UNITED STATES PATENT OFFICE 2,670,294

METHOD OF SEALING SAUSAGE CASINGS AND PRODUCT THEREOF

Joseph James Frank, Union, N. J.

Application February 4, 1950, Serial No. 142,490

9 Claims. (Cl. 99—176)

This invention relates to the manufacture of sausages, and to the sealing of flexible casings, and to new sealing means. The food stuffed package called a sausage is used in this specification as an outstanding example of the application of the invention.

The term sausage as employed herein is to be understood in a broad sense and not as limited to a pork product. Sausages are characterized by an impermeable casing which seals its contents against contamination; the contents have usually been considered as food stuffs, such as meat and cheese, but there is no fundamental reason to so limit the term, since sealing can be applied with equal merit by means of such casings, to things such as medicines, gunpowder, and fuel oil. The casing of sausage has usually been composed of animal intestine, called natural, or regenerated cellulose, called artificial or synthetic. Many other materials capable of similar use have been developed in recent decades including rubber products and nylon. The general characteristics of these casings are that they are pellicular, flexible, impervious, frequently transparent, and in the case of synthetic products, of material strength.

The traditional method of sealing such casings is to collapse the end, crumple or pleat it, and tie it with coarse string in intricate knots. The hands of those who tie the knots are frequently cut and the blood makes contact with the product; the resulting knot is unsanitary and collects dirt. It is a comparatively slow process. The appearance of the product is not neat and the string is unsanitary. There are other difficulties, but the foregoing recital is adequate as a statement of the problem.

It has been proposed and patents have issued, in December 1924, March 1923 and August 1943, to seal the ends of sausages by wire loops. In the 1924 patent two methods were proposed, in one of which a wire staple was twisted around the end of the sausage casing and in the other of which a heavy clamp or staple was squeezed shut upon the end of the casing. In the 1923 patent a wire was compressed about the mid portion of a long sausage to make little sausages in links, the ends of the sausage being presumably tied by string and the wire being twisted by hand after severance from a spool. In the 1943 patent a long sausage was squeezed together at a mid point to make little sausages and the constricted place was held by a Hotchkiss stapler.

Despite all these and other proposals, the sausage industry continued to tie by hand until a revolution in tying practice was accomplished by a joint invention of this applicant and another. Several reasons account for the refusal of the industry to adopt the early metallic closures, a few of which will be mentioned. In the first place they did not produce a perfect seal at the end of the casing capable of withstanding the treatment to which the sausage had to be subjected. Secondly, they tended to pinch and cut the casing or at least to weaken it, during application. Again, the sausage would be found to exude oily matter through weakened places in contact with small, sharp, rough edges or ends of the sealing means. Consequently, apart from basic inability to make a permanent and tight seal, the losses of meat products from employing the proposed means were sometimes greater than the losses from string tying.

This invention relates to the use of wire for the sealing of sausages, particularly for application to sausages of small size, so as to produce a complete seal. It constitutes an improvement over the former attempts to use wire or metal staples as a sealing material. It is an object of the invention to seal small sausages in a convenient way. Another and particular object is to apply wire with greater force to a casing than has heretofore been practicable and in so doing, to avoid the previous fault that the wire would damage the casings if drawn tightly enough to produce a sealing of sorts. Another object is to avoid the necessity of twisting the wire against the neck of a sausage, and to avoid pinching the casing.

In accordance with the invention a new seal is made by means of a new sealing means, this sealing means consisting of stiff wire coated with a flexible but softer material, the coating of softer, flexible material being of considerable thickness, for instance, of such thickness that the outside diameter is three times the diameter of the wire itself. This figure is not a limitation but it gives a representative figure which has been found successful in practice. The wire itself may be composed of metal such as steel, copper, and aluminum and the material that covers it may be rubber or other plastic. In its appearance it is a core of wire within a plastic tube. The plastics that may be employed are numerous; flexible vinyl, or butadiene, or cellulosic plastics are illustrative. The more flexible members of these classes are preferred.

In applying the wire to the end of a sausage casing it is preferred to pleat the casing, the end of the casing being flattened, pleated in even, small pleats, for instance on the order of a quarter or a half inch wide, the pleats are brought together in a tight block and the new binding material of stiff wire and plastic is wound around it snugly in a single turn having overlapped ends. This binding material is so tightly applied to the pleated end of the casing that it is snug. In practice, the binding material will be unwound from a reel and cut off after it has been applied to the end of the casing. In practice this may, and frequently does bend the pleats but without as yet necessarily constituting a perfect seal. The binding material is then flattened against the flat faces of the pleat, the stiffness of the wire providing the strength necessary to maintain the seal and the softer coating preventing the wire from biting into the material of the casing.

In a modified form of the invention a plastic sleeve, for instance a viscose band may be shrunk upon the pleated end of the casing, this band being thereafter wound about with wire preferably, but not necessarily coated. In this case the viscose band upon the casing serves in lieu of a coating on the wire.

In some cases it is advisable to take more than one turn of the wire around the neck of the casing and this is particularly true when the binding material contains wire of lighter gauge; and even in the case of binding material comprising wire of heavy gauge it is sometimes advantageous so to do.

Referring now to the drawings, Fig. 1 is a view of a length of the new sealing material.

Figure 1:
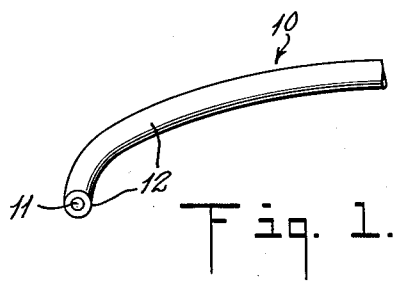

In the drawing 10 indicates generally the new sealing material which has a core 11 of copper wire about 1/8 inch in diameter, and 12 shows a coating of rubber on the wire, the total diameter of the material being between 1/4 and 1/16 of an inch. These dimensions are not restrictive.

Figure 2:
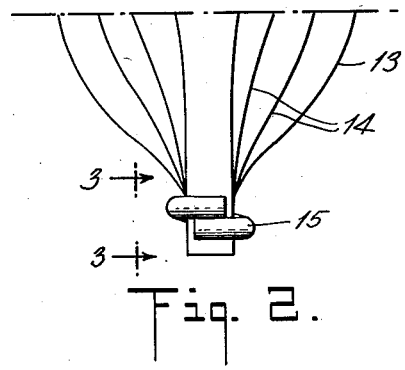
Fig. 2 is an elevational view of an end of a sausage casing sealed by means of this invention.

Fig. 2 shows at 13 the end of a sausage casing which has been collapsed and pleated, the pleats 14 being viewed in the flat. At 15 is shown the coated wire sealing means applied snugly to the pleated end of the sausage, with its own ends in overlapped relation. The extent of overlap is variable at will.

Figure 3:
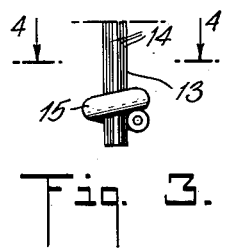
Fig. 3 is a view from position 3, 3 in Fig. 2.

In Fig. 3 the casing is rotated 90° and viewed at the ends of the pleats, the sealing means 15 being in position as in Fig. 2.

Figure 4:
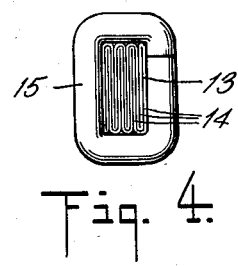
Fig. 4 is a sectional view on line 4, 4 of Fig. 3.

In Fig. 4 a section has been taken above the sealing means, which is viewed from above, clearly showing how the sealing means has been flattened upon the pleats. The short sides of the sealing means can be held in position during flattening to prevent their expansion away from the pleats, by holding them between walls during the flattening. Flattening may be by means of appropriate dies that approach and engage opposite faces of the binding means and pleat.

Figure 5:
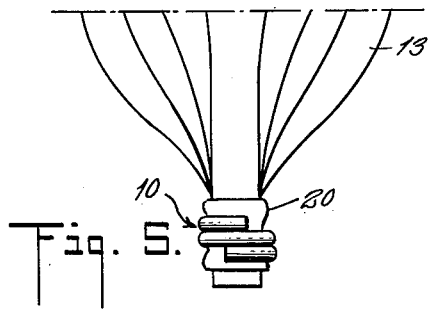
Fig. 5 is an elevational view showing a modification.

In Fig. 5 a regenerated cellulose band 20 has been applied to the pleated end of the casing and allowed to shrink there, a double turn of the sealing means 10 having been applied and flattened in accordance with the general principles of the invention. It is also to be observed that in the form of Fig. 5 the binding material can be plain stiff wire without any coating, as the band, particularly if it is fairly thick, will serve to protect the neck of the casing against the metal. The binding material is favorably applied to the cellulose band before it is wholly dry. When a dry band is used it is advisably applied in ribbon form, winding it around the pleat in a suitable number of snug turns, and applying the wire in a suitable number of turns over it, compression by flattening being applied afterward.

Figure 6:
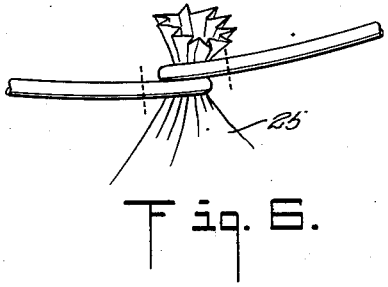
Fig. 6 is an elevational view showing our new sealing means applied to a paper bag.

In Fig. 6 is a modification of the invention in which the sealing means is looped around and drawn very tight upon the mouth of a bag 25, constricting it to a very small compass and with more force than could be applied by wire without the protection. Dotted lines indicate how, after the sealing is completed, neatness is attained by clipping off the ends of the wire. Such projecting ends would, under prior circumstances, using plain wire, scratch the hands of those who handle the bag and serve to prick the bag and weaken it, but this material furnishes adequate protection even to the ends of the wire, and even to other bags or sausages in a package.

Figure 7:
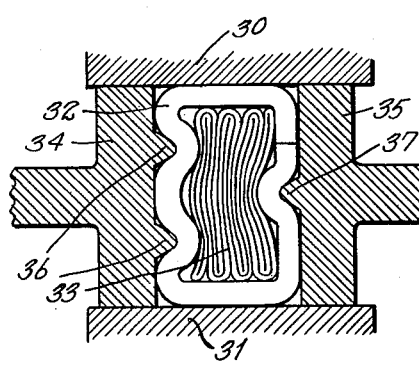
Fig. 7 shows in section a pleated casing and sealed with turns of crimped wire.

Fig. 6 may also be considered exemplary of a process of making long sausages into short, linked sausages. In such processes a long sausage is made and sealed at its ends, then press plates squeeze the food stuff out of the casing at an inward location, and a wire is twisted around the casing, the process being repeated until the sausage is divided into links. Sometimes this has been accomplished by hand operators who twist the sausage into links after it had been filled, a rather delicate operation requiring a substantial degree of skill.

Where it is desired to obtain an even firmer seal than that provided by such an arrangement as Fig. 5, the turns of wire, after or during flattening, may be crimped with crimps running at right angles to the turns of wire, that is, longitudinally of the casing. These crimps can be applied by jaws having a single ridge on one jaw opposed to and operating between double ridges on the cooperating jaw. This structure is shown in Fig. 7. In this figure 30—31 are guide walls at the ends of the wire winding 32 about the pleats 33 at the end of a bag or casing. Dies 34, 35 with cooperating offset ridges 36—36, 37 on their faces, have come together on the neck of the seal and have crimped the wire (preferably coated) upon the pleat, improving the seal.

The present invention constitutes an improvement over such processes that are needed to expel the food stuff from the portion that is to constitute the junction between links. The new binding material may be passed around the long sausage either by machine or by hand, and drawn tight. If it is desired to separate the links, two bindings may be made side by side, the casing being cut between the bindings in this way, small sausages neatly sealed at both ends by constriction and not by flat pleats may be prepared.

One of the standard methods of applying wire is in the form of staples and stapling machines of different sorts have been devised for different purposes. Some of the staples used in such machines are round and some are flat. The staples may be provided with flexible plastic coats and applied by stapling machines modified to take the larger staples.

The covering for the wire need not be soft. It may be quite hard as long as it is flexible. It need not be extremely thick, but should be thick enough to form, with the wire, a binding that presents a well rounded and not a sharp face to the material being bound. With casings of delicate material, the covering should be larger and preferably softer than is required where tough, heavy bags or casings are being sealed.

Wire can be quite stiff in small sizes, an example of which is found in some common, flat stationery staples. It may be round or flat, and the coating may be applied by extrusion or in any satisfactory way. Its size should depend on the requirements of the job.

In sealing, it sometimes suffices to take a simple turn and cut off the ends, flattening or crimping being omitted when the nature of the seal does not require it.

As many apparently widely different embodiments of the present invention may be made without departing from the spirit and scope thereof, it is to be understood that the invention is not limited to the specific embodiments.

What is claimed is:

1. A flexible casing with a constricted end sealed by a flattened winding of stiff wire coated with softer, flexible protective plastic, the total thickness of the coated wire being on the order of three times the thickness of the wire.

2. Link sausages having a single casing divided into links by a constricting turn of plastic coated wire, the total thickness of the plastic coated wire being about three times the thickness of the wire.

3. The product of claim 2 in which the plastic coated wire is crimped upon the constriction of the casing.

4. The method of sealing a flexible casing that comprises pleating a portion of the casing, taking a turn of stiff wire, coated with a layer of plastic of protective thickness tight about the pleat, and flattening the turn of wire about the pleat, the stiffness of the wire being sufficient to maintain its shape after flattening, and the coating being sufficient to present a well rounded and extensive lateral surface to the casing and to prevent the wire from damaging the casing, the total diameter of the coated wire being on the order of three times the diameter of the wire.

5. A method of sealing a flexible casing that comprises shrinking a plastic band upon the neck of the casing and applying a turn of stiff wire about the band in firm and sealing contact therewith.

6. The method of sealing a flexible tube that comprises constricting the end of the tube, applying a flexible protective band about the constriction, winding stiff wire about the band in a tight loop having untwisted, overlapped, oppositely directed ends, and flattening the loop upon the band.

7. A method of sealing a flexible tube that comprises taking a turn thereabout with stiff wire of length greater than a single turn coated with a resilient plastic of thickness sufficient to provide radial resilience, drawing the said coated wire tight upon the tube and laying extensions of the wire in excess of one turn in parallelism, and constricting the part of the tube within the turn by compressing the said parallel parts flat against said part.

8. A method of sealing a flexible tube that comprises taking a turn thereabout with stiff wire of length greater than a single turn coated with a resilient plastic of thickness sufficient to provide radial resilience, drawing the said coated wire tight upon the tube and laying extensions of the wire in excess of one turn in parallelism, constricting the part of the tube within the turn by compressing the said parallel parts flat against said part, and indenting the wire, thus making indentations in the material within the wire, and thus further constricting such material.

9. A method of sealing a flexible tube that comprises taking a turn thereabout with stiff wire of length greater than a single turn coated with a resilient plastic of thickness sufficient to provide radial resilience, drawing the said coated wire tight upon the tube and laying extensions of the wire in excess of one turn in parallelism, constricting the part of the tube within the turn by compressing the said parallel parts flat against said part, and indenting the wire, thus making indentations in the material within the wire, and thus further constricting such material, the thickness of the resilient plastic bringing the diameter of the sealing material to about three times the diameter of the wire itself.

JOSEPH JAMES FRANK.

References Cited in the file of this patent

UNITED STATES PATENTS

| Number | Name | Date |
| --- | --- | --- |
| 1,242,139 | Callahan | Oct. 9, 1917 |
| 1,447,577 | Tanner | Mar. 6, 1923 |
| 1,778,955 | Morrill | Oct. 21, 1930 |
| 1,953,310 | Peck | Apr. 3, 1934 |
| 2,042,227 | Hensel | May 26, 1936 |
| 2,128,443 | Vogel | Aug. 30, 1938 |
| 2,181,886 | Goodman | Dec. 5, 1939 |
| 2,255,810 | Replogle | Sept. 16, 1941 |
| 2,275,198 | Patnode et al. | Mar. 3, 1942 |
| 2,307,181 | Young | Jan. 5, 1943 |
| 2,406,661 | Brady | Aug. 27, 1946 |
| 2,460,963 | Young | Feb. 8, 1949 |
| 2,471,701 | Post | May 31, 1949 |
| 2,493,063 | Frank et al. | Jan. 3, 1950 |
| 2,526,902 | Rublee | Oct. 24, 1950 |